(12) United States Patent
Yang et al.

(10) Patent No.: US 8,525,937 B2
(45) Date of Patent: Sep. 3, 2013

(54) APPARATUS AND METHOD FOR CALIBRATING AUDIO-VISUAL SIGNAL

(75) Inventors: Wen Chieh Yang, Hsinchu County (TW); Ching Fu Lan, Hsinchu County (TW); Jen Hsing Wang, Hsinchu County (TW); Yi Hsuan Lai, Hsinchu County (TW); Chin Fu Ho, Hsinchu County (TW); Hsin Chuan Kuo, Hsinchu County (TW); You Tsai Cheng, Hsinchu County (TW); Tai Lai Tung, Hsinchu County (TW)

(73) Assignee: MStar Semiconductor, Inc., Hsinchu (TW)

( * ) Notice: Subject to any disclaimer, the term of this patent is extended or adjusted under 35 U.S.C. 154(b) by 85 days.

(21) Appl. No.: 13/216,680

(22) Filed: Aug. 24, 2011

(65) Prior Publication Data
US 2012/0218420 A1 Aug. 30, 2012

(30) Foreign Application Priority Data
Feb. 25, 2011 (TW) ............................. 100106374 A

(51) Int. Cl.
*H04N 5/455* (2006.01)
*H03K 9/06* (2006.01)
*H04L 27/00* (2006.01)

(52) U.S. Cl.
USPC ............ 348/726; 375/322; 375/324; 455/324

(58) Field of Classification Search
USPC . 348/181, 192–193, 725, 726; 375/224–236, 375/346–350, 322–324; 455/324
See application file for complete search history.

(56) References Cited

U.S. PATENT DOCUMENTS

| 7,151,577 B2 * | 12/2006 | Yamamoto et al. | ............ 348/729 |
| 2006/0133548 A1 * | 6/2006 | Oh et al. | ....................... 375/346 |

* cited by examiner

*Primary Examiner* — Michael Lee
(74) *Attorney, Agent, or Firm* — WPAT, PC; Justin King

(57) ABSTRACT

An apparatus for calibrating an audio-visual (AV) signal includes a controller for generating a control signal, a controllable filter for selectively filtering the AV signal in response to the control signal to output either the AV signal or a filtered AV signal; and a calibrator for generating a group of calibrating coefficients according to the filtered AV signal and calibrating the AV signal according to the group of calibrating coefficients.

17 Claims, 10 Drawing Sheets

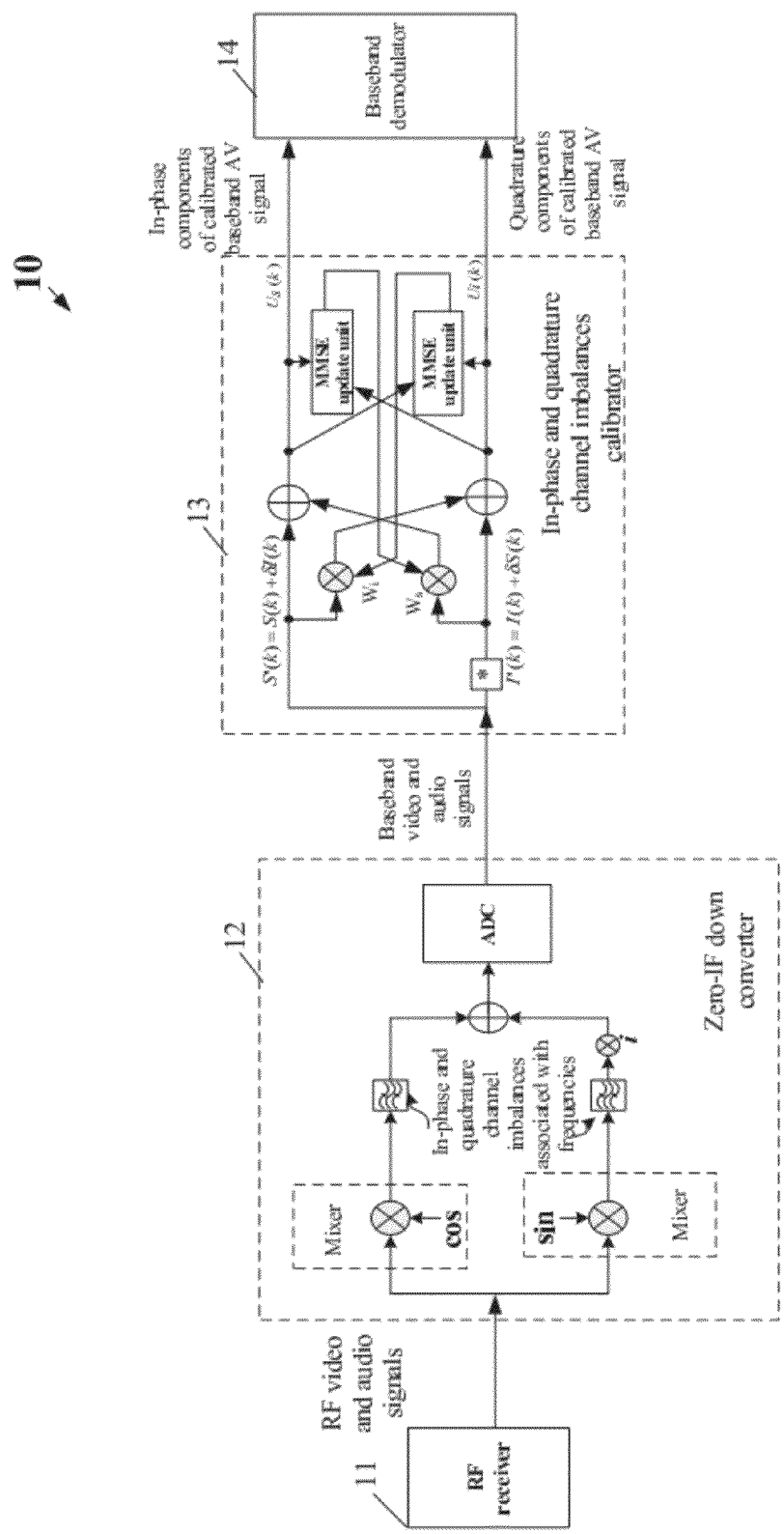
Figure 1.1 (PRIOR ART)

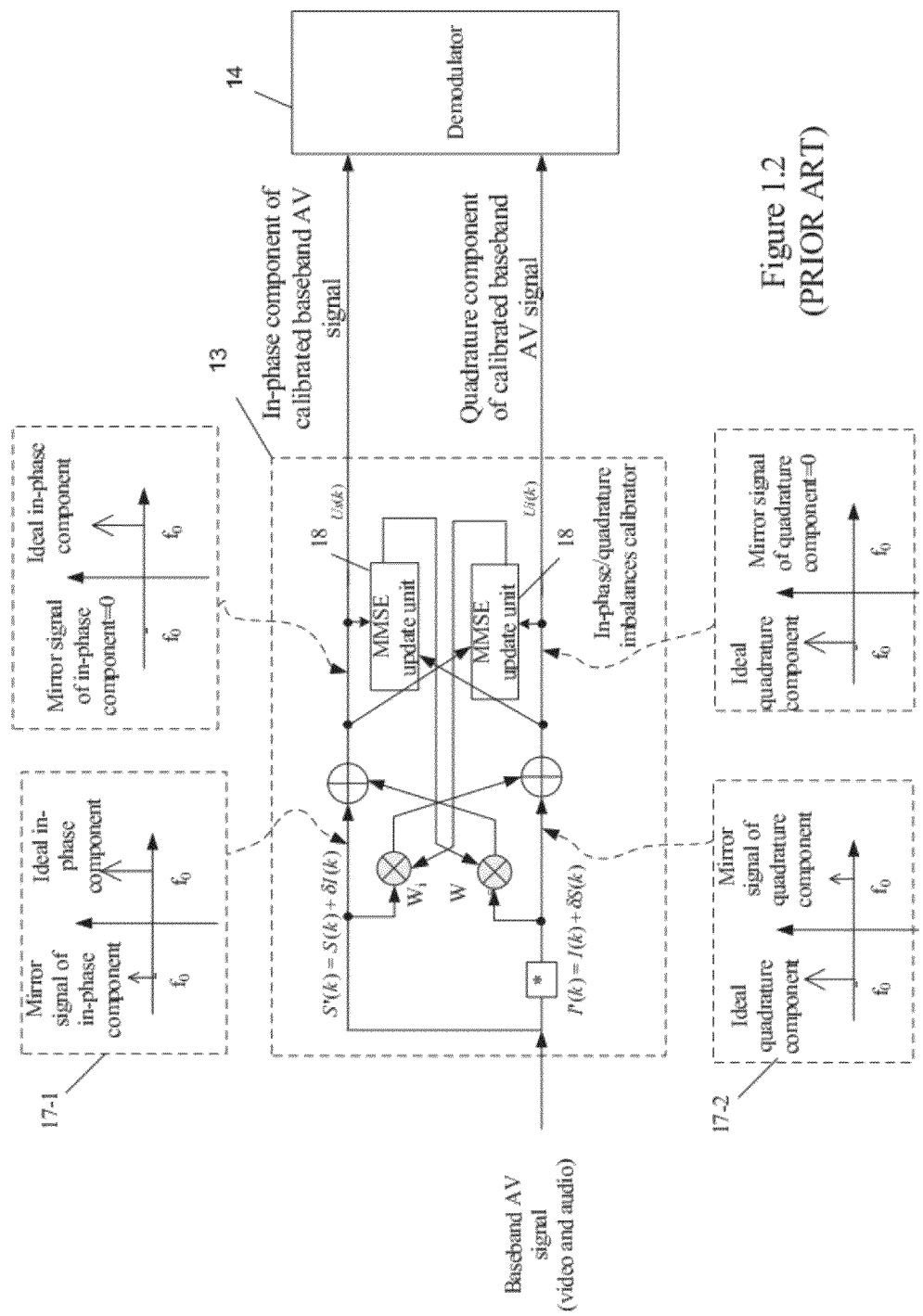
Figure 1.2
(PRIOR ART)

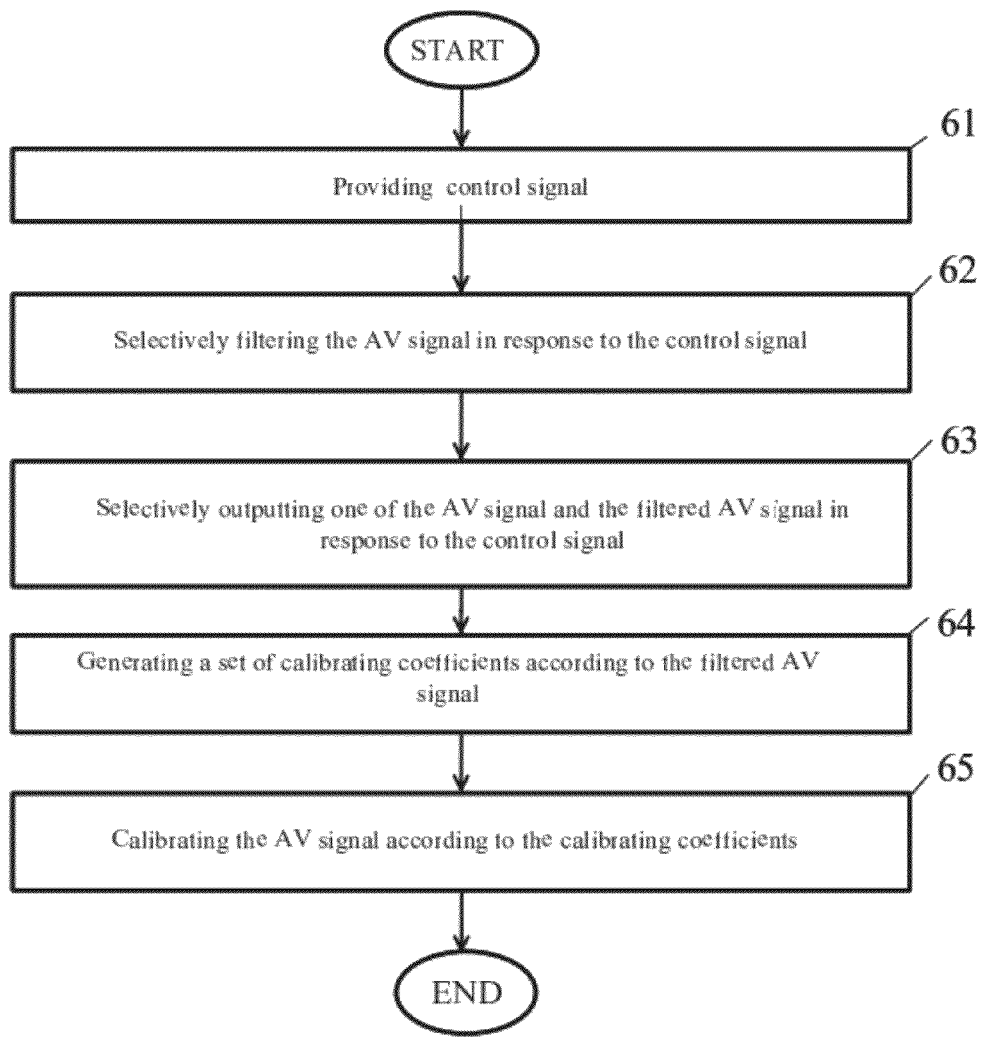
Figure 6.1

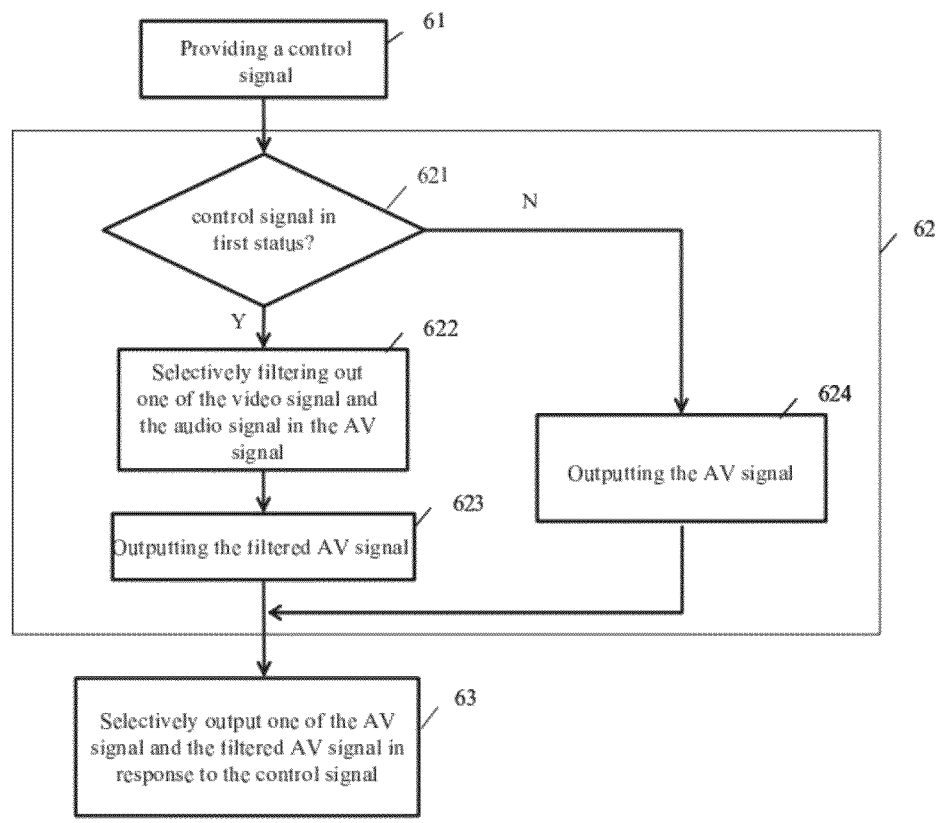
Figure 6.2

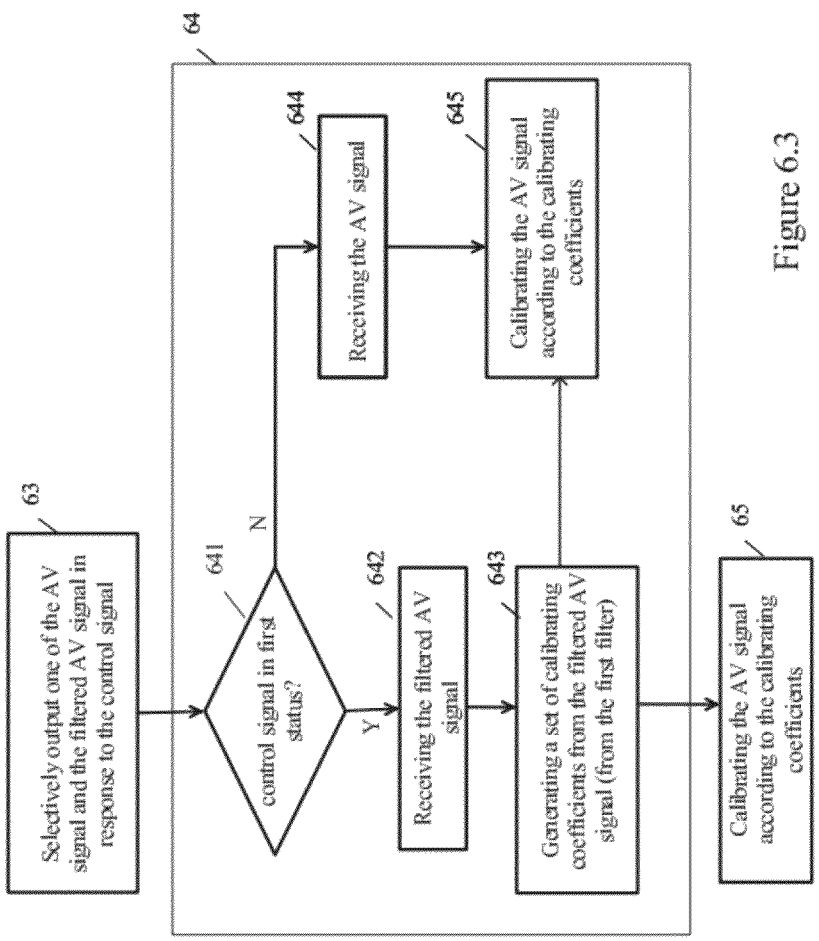
Figure 6.3

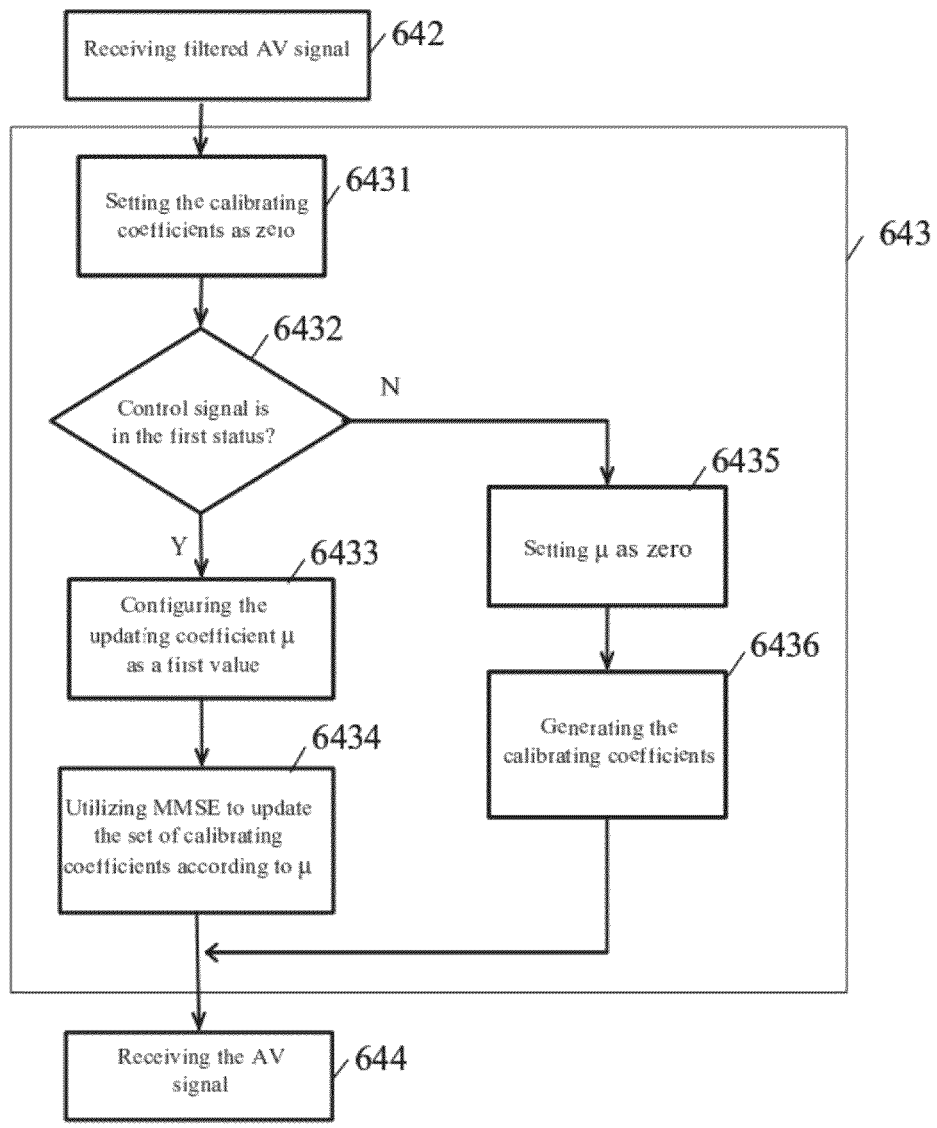
Figure 6.4

APPARATUS AND METHOD FOR CALIBRATING AUDIO-VISUAL SIGNAL

CROSS REFERENCE TO RELATED PATENT APPLICATION

This patent application is based on Taiwan, R.O.C. patent application No. 100106374 filed on Feb. 25, 2011.

FIELD OF THE INVENTION

The present invention relates to an apparatus for calibrating an audio-visual (AV) signal and method thereof, and more particularly, to an apparatus for calibrating a baseband AV signal applied to an analog television (TV) system and method thereof.

BACKGROUND OF THE INVENTION

FIG. 1.1 is a block diagram of a wireless receiver for receiving an analog AV signal in the prior art. A wireless receiver 10 comprises a radio frequency (RF) receiver 11, a zero intermediate frequency (zero-IF) direct down converter 12, an In-phase/Quadrature (I/Q) imbalance calibrator 13, and a baseband demodulator 14. The RF receiver 11 receives an RF AV signal that comprises an RF video signal and an RF audio signal. The RF video signal and the RF audio signal are applied to an analog TV system, and are respectively within different frequency bands and have different central frequencies.

FIG. 1.2 shows a typical I/Q imbalance calibrator 13 in the prior art. It represents a schematic view with comparison between a down-converted baseband video and audio signals and ideal signals. When the foregoing baseband video signal and the baseband audio signal are directly down-converted via the zero-IF direct down converter 12, in-phase and quadrature component imbalances often occur. As shown in a dotted frame 17-1, suppose that in-phase components of an ideal baseband video/audio signal have a central frequency $f_0$ in the frequency domain. The imbalance of the in-phase components of the baseband video/audio signal has a mirror signal symmetric to the frequency $f_0$, where the mirror signal has a central frequency $-f_0$ in the frequency domain. As shown in a dotted frame 17-2, the quadrature components of an ideal baseband video/audio signal have a central frequency $-f_0$ in the frequency domain. The imbalance of the quadrature components of the baseband video/audio signal has a mirror signal symmetric to the frequency $-f_0$, where the mirror signal has a central frequency $f_0$ in frequency domain. More specifically, since the RF video signal and the RF audio signal are within different frequency bands and have different central frequencies, the down-converted baseband video and audio signals are also within different frequency bands and have different frequencies. In practical applications, the down-converted baseband video and audio signals respectively have different I/Q imbalance values. Therefore, a solution is needed to solve the foregoing problem of imbalances of signals that are down-converted. However, with respect to signals within two different frequency bands, the foregoing conventional structure of calibrator and calibrating method only perform identical calibration based on the down-converted mixed signals, fails in specifically calibrating the video signal or the audio signal, and thus creates an un-ideal calibrating effect.

In view of the foregoing issues, a calibrator for calibrating an AV signal and a method thereof are provided to solve the foregoing problems of the I/Q imbalance calibrator 13 of the conventional wireless receiver 10 and the method thereof.

SUMMARY OF THE INVENTION

Theoretically, different calibrating coefficients are in need to calibrate I/Q imbalances of a baseband video signal and a baseband audio signal, respectively. For example, a first group of calibrating coefficients $W_{As}$ and $W_{Aj}$ are provided to respectively calibrate in-phase components and quadrature components of the baseband audio signal, and a second group of calibrating coefficients $W_{Vs}$ and $W_{Vj}$ are provided to respectively calibrate in-phase components and quadrature components of the baseband video signal. The two groups of calibrating coefficients are different from each other.

According to an embodiment of the present invention, an apparatus for calibrating an AV signal comprises a controller, for generating a control signal; a controlled filter, for selectively filtering the AV signal in response to the control signal to output either the AV signal or a filtered AV signal; and a calibrator, for generating a group of calibrating coefficients according to the filtered AV signal and calibrating the AV signal according to the group of calibrating coefficients.

The advantages and spirit related to the present invention can be further understood via the following detailed description and drawings.

BRIEF DESCRIPTION OF THE DRAWINGS

FIG. 1.1 is a block diagram of a wireless receiver for receiving an analog TV signal in the prior art.

FIG. 1.2 is a schematic diagram of a conventional I/Q imbalance calibrator and comparison between down-converted baseband video and audio signals and ideal signals.

FIG. 6.1 is a flow chart of a method for calibrating an AV signal in accordance with an embodiment of the present invention.

FIG. 6.2 is a flow chart of a method for calibrating an AV signal in accordance with another embodiment of the present invention.

FIG. 6.3 is a flow chart of a method for calibrating an AV signal in accordance with yet another embodiment of the present invention.

FIG. 6.4 is a flow chart of a method for calibrating an AV signal in accordance with still another embodiment of the present invention.

DETAILED DESCRIPTION OF THE PREFERRED EMBODIMENT

Figure 2:
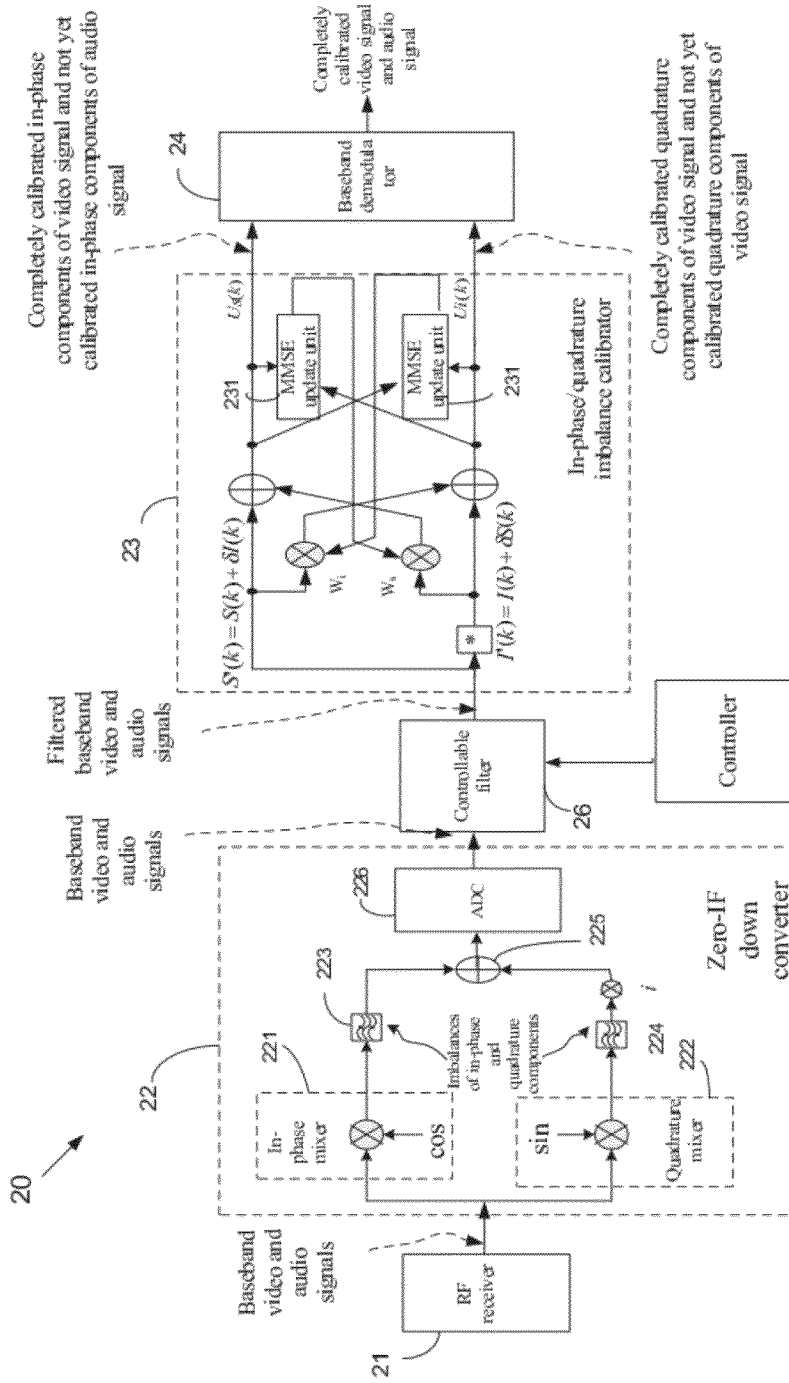
FIG. 2 is a block diagram of a wireless receiver in accordance with an embodiment of the present invention.

The following description and figures are disclosed to gain a better understanding of the advantages of the present invention, and identical components in the various figures are marked with identical reference symbols. FIG. 2 is a block diagram of a wireless receiver in accordance with an embodiment of the present invention. A wireless receiver 20 comprises an RF receiver 21, a zero-IF direct down converter 22, an I/Q imbalance calibrator 23, and a baseband demodulator 24, a controllable filter 26, and a controller 28.

More specifically, the wireless receiver 20 receives an RF AV signal via the RF receiver 21, and the RF AV signal comprises an RF video signal and an RF audio signal having different frequency bands and different RF central frequencies.

The received RF AV signal is down-converted via the zero-IF direct down converter 22 to a baseband AV signal that comprises a baseband video signal and a baseband audio signal. The zero-IF direct down converter 22 comprises an in-phase mixer 221, a quadrature mixer 222, an in-phase band-pass filter 223, a quadrature band-pass filter 224, a synthesizer 225 (e.g., an adder), and an analog-to-digital converter (ADC) 226.

In-phase components of the RF AV signal received via the RF receiver 21 are down converted to in-phase components of the baseband AV signal by the in-phase mixer 221. Undesired mirror signals are filtered out from the in-phase components of the baseband AV signal from the in-phase band-pass filter 223. Likewise, quadrature components of the RF AV signal received via the RF receiver 21 are down converted to quadrature components of the baseband AV signal via the quadrature mixer 222, and undesired mirror signals are filtered out from the quadrature components of the baseband AV signal from the quadrature band-pass filter 224. The quadrature and in-phase components are then synthesized via the synthesizer (adder) 225 to become a baseband AV signal. At this stage, the synthesized baseband AV signal that is still an analog signal is converted via the ADC 226 to a digital baseband AV signal.

Due to different gain errors and phase errors among the in-phase mixer 221, the quadrature mixer 222, the in-phase band-pass filter 223, and the quadrature band-pass filter 224, imbalances of in-phase components and quadrature components of the down-converted AV signal (i.e., the baseband AV signal) are generated when the in-phase mixer 221 and the quadrature mixer 222 respectively down-convert the in-phase components and the quadrature components of the RF AV signal (including the RF video signal and the RF audio signal) and the in-phase band-pass filter 223 and the quadrature band-pass filter 224 respectively filter the in-phase components and the quadrature components of the RF AV signal.

As mentioned above, the baseband video signal and the baseband audio signal are within different frequency bands and have different frequencies. For example, the baseband video signal has a first frequency which is within a first frequency band, and the baseband audio signal has a second frequency which is within a second frequency band (the first frequency is not equal to the second frequency). Therefore, the imbalance of the in-phase/quadrature components of the baseband video signal is different from that of the in-phase/quadrature components of the baseband audio signal. Accordingly, two different groups of calibrating coefficients are required to calibrate the baseband video signal and the baseband audio signal, respectively. For example, a first group of calibrating coefficients $W_{As}$ and $W_{Aj}$ are required for respectively calibrating the in-phase components and the quadrature components of the baseband audio signal, and a second group of calibrating coefficients $W_{Vs}$ and $W_{Vj}$ are required for respectively calibrating the in-phase components and the quadrature components of the baseband video signal. The foregoing two groups of calibrating coefficients ($W_{As}$, $W_{Aj}$) and ($W_{Vs}$, $W_{Vj}$) are different due to the difference in signal components.

However, according to a wireless receiver structure provided by the present invention, only a single I/Q imbalance calibrator provides one group of calibrating coefficients for calibrating both the foregoing in-phase/quadrature imbalances of the baseband video signal and the baseband audio signal. Therefore, in an embodiment, a controllable filter 26 is coupled between the zero-IF direct down converter 22 and the I/Q imbalance calibrator 23, and a controller 28 is provided to control the controlled filter 26. With the controllable filter 26 working in conjunction with switching of operation modes of the I/Q imbalance calibrator 23 (details thereof are given with reference to FIG. 3 in the following description), imbalances of in-phase/quadrature components of video and audio signals that are calibrated by the I/Q imbalance calibrator 23 and are demodulated by the baseband demodulator 24 are completely calibrated.

The controllable filter 26 comprises a first input end, a second input end, and an output end, and the controller 28 comprises an output end which provides input to an input end of the controllable filter. In this embodiment, the first input end of the controllable filter 26 coupled to an output end of the zero-IF direct down converter 22 receives a digital baseband video signal (referred to as the video signal) and a digital baseband audio signal (referred to as the audio signal) that are down-converted and analog-to-digital converted via the zero-IF direct down converter 22. In addition, the second input end of the controllable filter 26 coupled to the output end of the controller 28 receives a control signal generated by the controller 28.

In this embodiment, the control signal generated by the controller 28 may have two states, e.g., a first status representing a logical-high voltage level and a second status representing a logical-low voltage level. The control signal switches between the first status and the second status in response to a first mode, a second mode, and a third mode of the calibrator 23, and details thereof are given with reference to FIG. 3.

Figure 3:
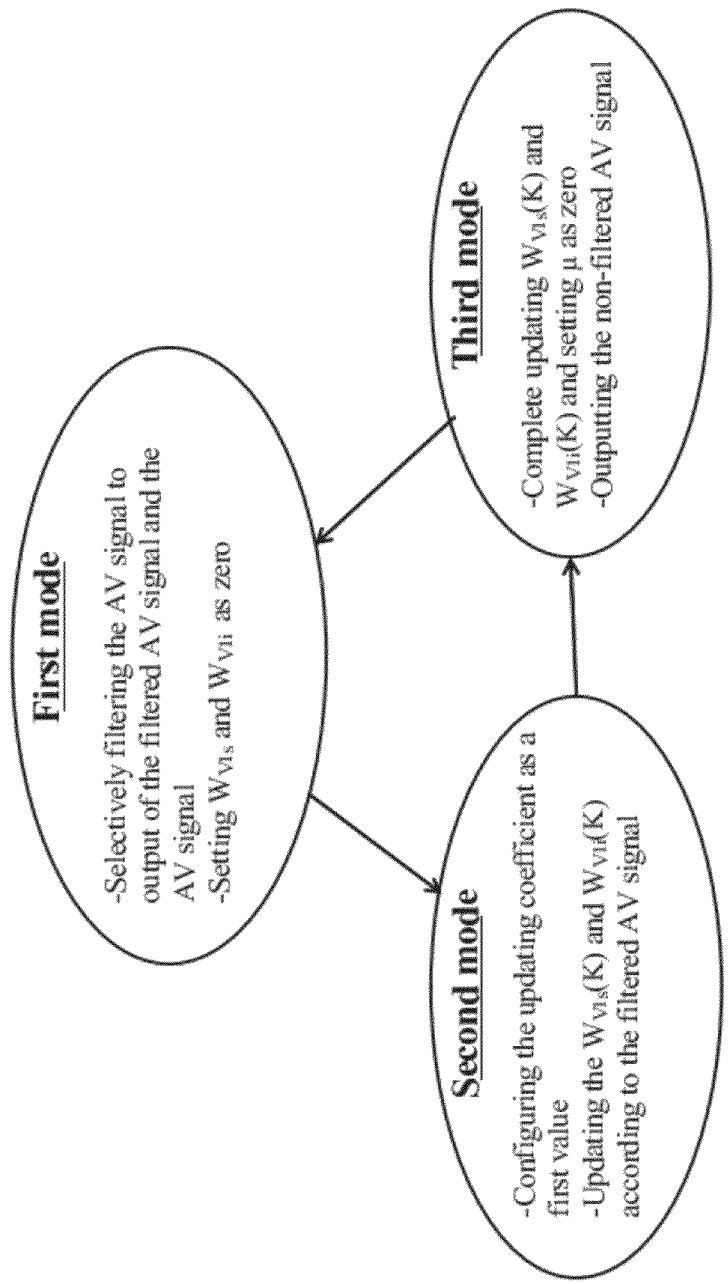
FIG. 3 is a schematic diagram of operational modes of a calibration and the switching among operational modes in accordance with an embodiment of the present invention.

FIG. 3 is a schematic diagram of operation modes of the calibrator 23 and switching of the modes in accordance with an embodiment of the present invention. The calibrator 23 initially operates in the first mode, and at this point, the control signal is initialized correspondingly in the first status. In response to the first status of the control signal, the controllable filter 26 filters the received video and audio signals. More specifically, the controllable filter 26 comprises a first band-pass filter 261 associated with the first frequency of the video signal shown in FIG. 4. The first band-pass filter 261 allows the video signal to pass through unchanged while filtering out the audio signal.

Figure 4:
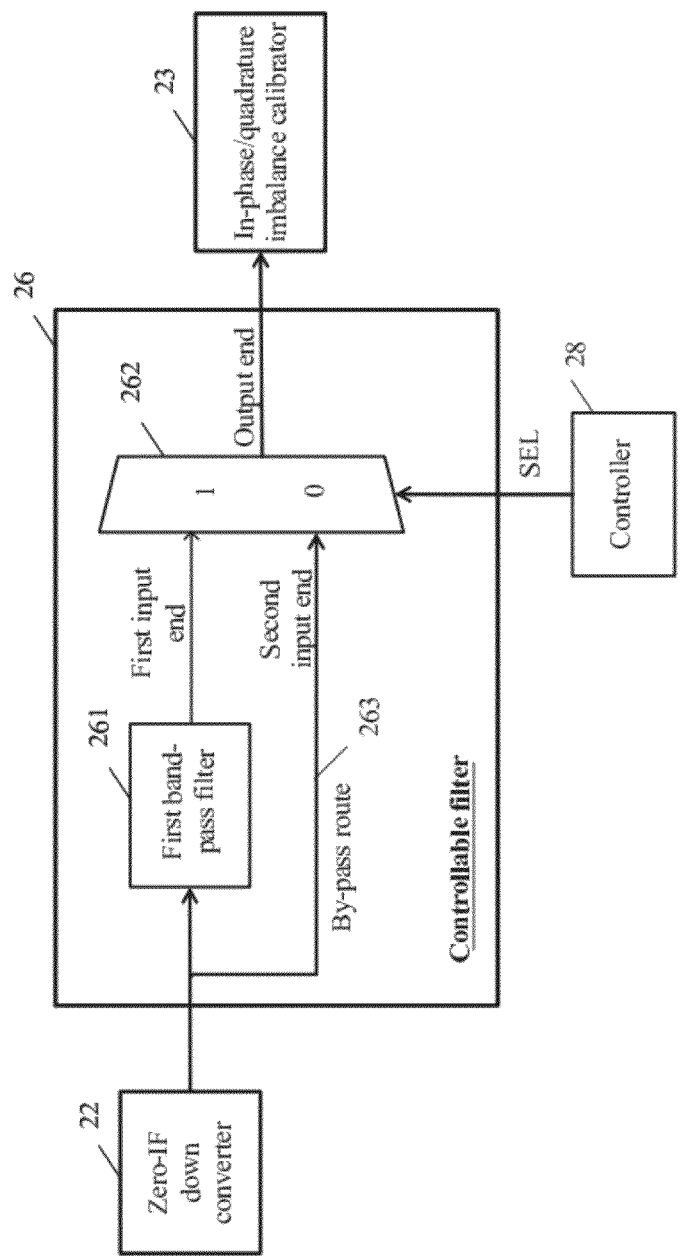
FIG. 4 is a block diagram of a controlled filter and a controller in accordance with an embodiment of the present invention.

FIG. 4 is a block diagram of the controlled filter 26 and the controller 28 in accordance with an embodiment of the present invention. The controlled filter 26 comprises the first band-pass filter 261 associated with the first frequency of the video signal, a multiplexer 262, and a bypass route 263. In this embodiment, the bypass circuit comprises a multiplexer 262 and a bypass route 263. The multiplexer 262 has a first input end, a second input end, and an output end. The first input end of the multiplexer 262 coupled to an output end of the first band-pass filter 261 receives the AV signal that is filtered, and the second input end of the multiplexer 262 coupled to the output end of the zero-IF direct down converter 22 via the bypass circuit 263 directly receives the AV signal that is not yet filtered. In addition, in response to the control signal (e.g., a selection signal SEL of the multiplexer 262 in this embodiment corresponding to the first mode), the multiplexer 262 selectively outputs at its output end either the filtered AV signal received at its first input end or the unfiltered AV signal received at its second input end to the calibrator 23.

As mentioned above, when the calibrator 23 operates in the first mode, the control signal SEL is at the logical-high voltage level, i.e., the first status. In response to the control signal SEL, the multiplexer 262 outputs at its output end the filtered AV signal received at its first input end to the calibrator.

When the filtered AV signal (i.e., the video signal passed through the first band-pass filter 261) is received, the calibrator 23 switches to operate in the second mode. Referring to FIG. 3, when the calibrator 23 operates in the second mode, the control signal SEL maintains the first status, so that the video signal passed through the first band-pass filter 261 is continuously inputted through the multiplexer 262 to the calibrator 23. According to in-phase components and quadrature components of the filtered video signal (i.e., the video signal passed through the first band-pass filter 261), the calibrator 23 generates a group of calculating coefficients $W_{\nu 1s}$ and $W_{\nu 1i}$ respectively with respect to the in-phase and quadrature imbalances of the video signal to calibrate more precisely the in-phase and quadrature imbalances of the filtered video signal.

Figure 5:
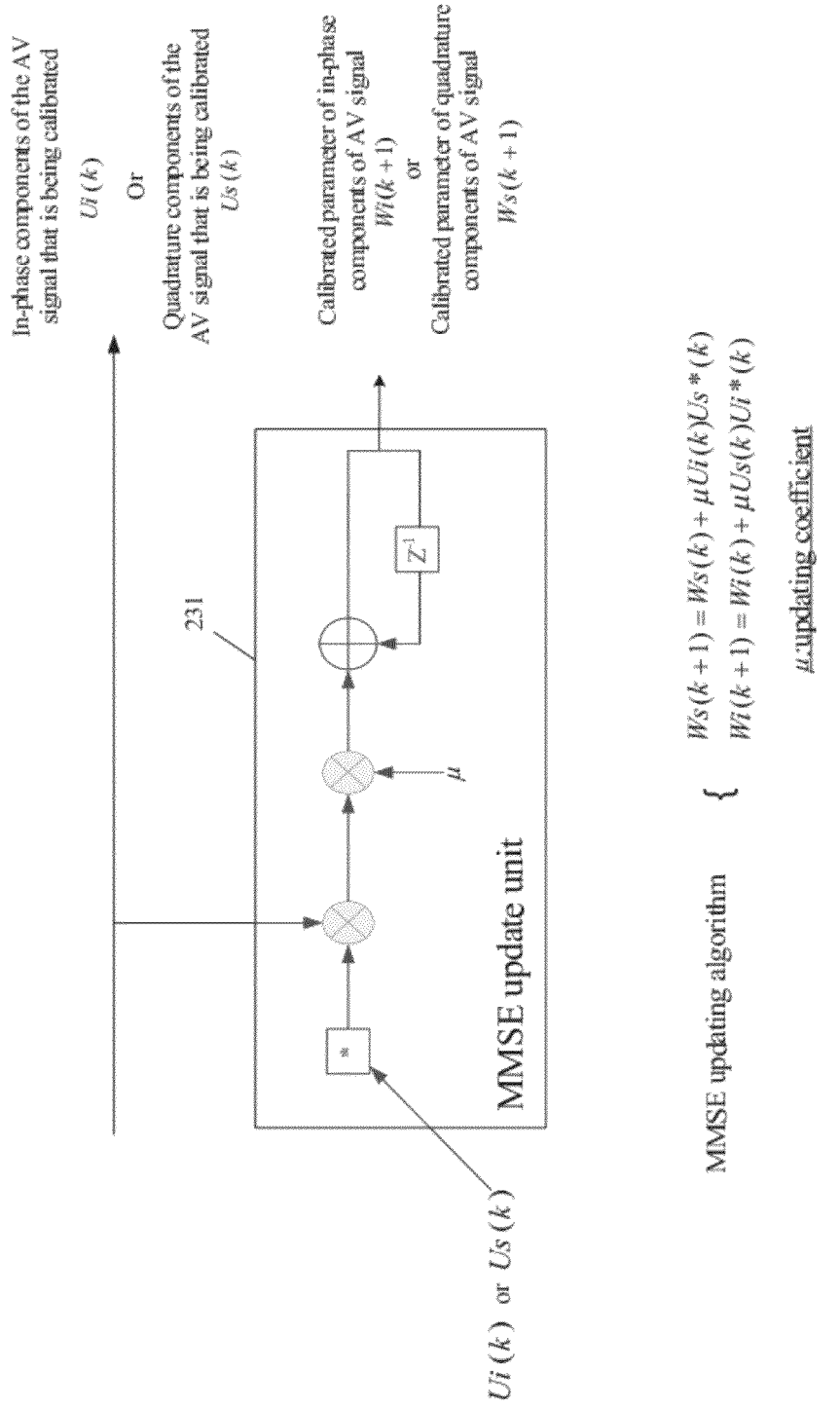
FIG. 5 is a block diagram of a minimum mean-square error (MMSE) updater in accordance with an embodiment of the present invention.

More specifically, the calculating coefficients $W_{\nu 1s}$ and $W_{\nu 1i}$ are generated by a set of minimum mean-square error (MMSE) update units 231 included in the calibrator 23. FIG. 5 is a block diagram of an MMSE update units 231 in accordance with an embodiment of the present invention. It is to be noted that, since each of the set of the MMSE update units 231 has an identical structure, only one MMSE update unit is taken as an example to illustrate an operation manner of the group of MMSE update unit 231. Referring to FIG. 5, the set of MMSE update units 231 generates the group of calibrating coefficients $W_{\nu 1s}$ and $W_{\nu 1i}$ according to in-phase components $U_s$, quadrature components $U_j$, and an updating coefficient μ of the filtered video signal.

An operating flow of the set of MMSE update units 231 is described below. When the calibrator 23 operates in the first mode, the group of calibrating coefficients $W_{\nu 1s}$ and $W_{\nu 1i}$ are respectively defined as an initial value, and in this embodiment, the initial value is zero. That is, $W_{\nu 1s}(0)=0$ and $W_{\nu 1i}(0)=0$ while the calibrator 23 operates in the first mode.

When the calibrator 23 operates in the second mode, the updating coefficient μ is defined as a first value. In this embodiment, the group of calibrating coefficients $W_{\nu 1s}(k)$ and $W_{\nu 1i}(k)$ are respectively updated according to the updating coefficient μ having the first value as well as the in-phase components $U_s$ and the quadrature components $U_j$ of the filtered AV signal (i.e., the video signal passed through the first filter). This updating may be done recursively. After a certain number of times of recursion calculation, the group of calibrating coefficients $W_{\nu 1s}(k)$ and $W_{\nu 1i}(k)$ are converged to a group of fixed coefficients $W_{\nu 1s}$ and $W_{\nu 1j}$, that are required for calibrating the in-phase and quadrature imbalances of the video signal. That is, at this point, the calibrator 23 generates the group of calibrating coefficients $W_{\nu 1s}$ and $W_{\nu 1j}$ according to the filtered AV signal (i.e., the video signal passed through the first filter) and the in-phase and quadrature balances of the filtered AV signal. It is to be noted that, when the calibrator 23 operates in the first mode and the second mode, the control signal SEL maintains the first status representing the logical-high level, i.e., in response to the first status of the control signal, the calibrator 23 generates the group of calculating coefficients $W_{\nu 1s}$ and $W_{\nu 1j}$ according to the filtered AV signal.

When the group of calibrating coefficients $W_{\nu 1s}$ and $W_{\nu 1j}$ are respectively calculated via the set of MMSE update units 231 (i.e., when the group of calibrating coefficients $W_{\nu 1s}$ and $W_{\nu 1j}$ are generated via the calibrator 23), the calibrator 23 switches to the third mode. Referring back to FIG. 3, when the calibrator 23 operates in the third mode, the updating coefficient μ is defined as zero to stop updating the MMSE update units 231, i.e., the group of calibrating coefficients calculated via the MMSE update units 231 are still the foregoing group of calibrating coefficients $W_{\nu 1s}$ and $W_{\nu 1i}$.

When the calibrator 23 operates in the third mode, the control signal SEL switches to the second status representing the logical-low level, so that the controlled filter 26 outputs the unfiltered AV signal (i.e., the video signal and the audio signal) to the calibrator 13 according to the second status of the control signal SEL. Referring to FIG. 4, when the control signal SEL has the second status representing the logical-low level, the multiplexer 222 directly outputs via the bypass circuit 223 the AV signal received from the zero-IF direct down converter 22 to the calibrator 23, so that the calibrator 23 can simultaneously calibrate the in-phase and quadrature imbalances of the AV signal. That is, the calibrator 23 simultaneously calibrates the in-phase/quadrature imbalances of the unfiltered video signal and the unfiltered audio signal. It is to be noted that, when the calibrator 23 operates in the third mode, the calibrator 23 generates the group of calibrating coefficients $W_{\nu 1s}$ and $W_{\nu 1i}$. Since the group of calibrating coefficients $W_{\nu 1s}$ and $W_{\nu 1i}$ are calculated via the MMSE update units 231 according to the video signal passed through the first filter, the calibrator 23 can completely calibrate the in-phase/quadrature imbalances of the video signal of the unfiltered AV signal (i.e., the unfiltered video signal and the unfiltered audio signal). As illustrated in FIG. 2, the foregoing video signal that is calibrated by the calibrator 23 and the audio signal that is not yet calibrated correctly are simultaneously outputted at the output end of the calibrator and are transmitted to the baseband demodulator 24. The MMSE update units 231 of the I/Q imbalance calibrator 23 generate the calibrating coefficients $W_{\nu 1s}$ according to the amplitude and phase of in-phase components of the filtered video signal, and generate the calibrating coefficients $W_{\nu 1i}$ according to the amplitude and phase of the quadrature components of the filtered video signal. In this embodiment, although the I/Q imbalance calibrator 23 only comprises a set of MMSE update units 231, the calibrating coefficients $W_{\nu 1s}$ and $W_{\nu 1i}$ can achieve complete and accurate calibration of the video signal imbalances for the reason that the calibrating coefficients $W_{\nu 1s}$ and $W_{\nu 1i}$, are generated according to the amplitude and phase of the filtered video signal.

The in-phase/quadrature imbalances of the audio signal cannot be completely and accurately calibrated via the calibrator 13 alone; however, with an appropriate frequency band rule, the undesired signal components (i.e., the mirror signal shown in FIG. 1.2) created by the in-phase and quadratures imbalance of the audio signal are filtered out by the baseband demodulator 24 having filtering functionality. More specifically, with the appropriate frequency band division, the undesired signal components created due to the in-phase and quadrature imbalances of the down-converted audio signal fall outside the bandwidth of the baseband demodulator 24. In other words, in the wireless receiver 20, the RF receiver 21 is wide-band, and relatively, the baseband demodulator 24 is narrow-band. With the appropriate frequency band division, the undesired signal components created due to the in-phase and quadrature imbalances of the down-converted audio signal become an output-band signal for the baseband demodulator 24 that has a smaller bandwidth in the frequency domain. Therefore, the in-phase and quadrature imbalances of the audio signal not yet completely calibrated by the calibrator 23 are overcome via the baseband demodulator 24.

FIG. 6.1 to FIG. 6.4 are flow charts of a method of calibrating an AV signal in accordance with an embodiment of the present invention.

FIG. 6.1 shows a flow chart of a primary flow of a method for calibrating an AV signal in accordance with an embodiment of the present invention. Referring to FIG. 6.1, the method comprises the following steps. In Step 61, a control signal having a first status representing a logical-high level and a second status representing a logical-low level is provided.

In Step 62, the AV signal is selectively filtered in response to the first status or the second status of the control signal. For example, the AV signal is filtered in response to the first status of the control signal; and the AV signal is not filtered in response to the second status of the control signal.

In Step 63, either the AV signal or a filtered AV signal is outputted in response to the control signal. For example, the filtered AV signal is outputted in response to the first status of the control signal; and the AV signal is outputted in response to the second status of the control signal.

In Step 64, a group of calibrating coefficients ($W_{V1s}$, $W_{V1i}$) are generated according to the filtered AV signal. More specifically, the group of calibrating coefficients ($W_{V1s}$, $W_{V1i}$) are generated according to the filtered AV signal (i.e., the video signal passed through the first band-pass filter 221 in the foregoing description).

In Step 65, the AV signal is calibrated according to the group of calibrating coefficients ($W_{V1s}$, $W_{V1i}$), i.e., the video signal and the audio signal are simultaneously calibrated according to the group of calibrating coefficients ($W_{V1s}$, $W_{V1i}$) generated according to the video signal passed through the first band-pass filter 221.

FIG. 6.2 shows a flow chart of a secondary flow of a method for calibrating an AV signal in accordance with an embodiment of the present invention. More specifically, FIG. 6.2 shows the step of selectively filtering the AV signal in response to the control signal as described in Step 62 of FIG. 6.1. Referring to FIG. 6.2, in step 62, the AV signal is selectively filtered in response to either the first status or the second status of the control signal.

In Step 621, the status of the control signal is to be determined. When it is determined that the control signal is in the first status, the flow proceeds to Step 622 in which either the audio signal or the video signal is filtered out.

In Step 623, when either the audio signal or the video signal is filtered out, the filtered AV signal is outputted. For example, when the audio signal is filtered out in Step 622, the video signal is outputted in Step 623; and when the video signal is filtered output in Step 622, the audio signal is outputted in Step 623. When it is determined that the control signal is in the second status (i.e., not in the first status) in Step 621, the AV signal is not filtered, i.e., the AV signal is directly outputted in Step 624.

FIG. 6.3 is a flow chart of a secondary flow of a method for calibrating an AV signal in accordance with an embodiment of the present invention. More specifically, FIG. 6.3 shows the step of performing calibration according to the group of calibrating coefficients ($W_{V1s}$, $W_{V1i}$), i.e., the group of calibrating coefficients ($W_{V1s}$, $W_{V1i}$) according to the filtered AV signal, as described in Step 64 of FIG. 6.1. For example, the filtered AV signal is the video signal passed through the first filter, and the group of calibrating coefficients ($W_{V1s}$, $W_{V1i}$) are generated according to the video signal.

In Step 641, the status of the control signal is determined. When it is determined that the control signal is in the first status, the flow proceeds to Step 642 in which the filtered AV signal is received. In this embodiment, the filtered AV signal is the video signal passed through the first filter.

In Step 643, the calibrating coefficients ($W_{V1s}$, $W_{V1i}$) are generated according to the filtered AV signal. That is, in this embodiment, the group of calibrating coefficients ($W_{V1s}$, $W_{V1i}$) required for calibrating the in-phase and quadrature imbalances of the video signal are generated according to the video signal passed through the first filter.

In Step 641, when it is determined that the control signal is in the second status (i.e., not in the first status), the flow proceeds to Step 644 in which the AV signal (i.e., the unfiltered AV signal comprising the video signal and the audio signal) is received.

In Step 645, the calibrator calibrates the AV signal according to the group of calibrating coefficients ($W_{V1s}$, $W_{V1i}$). It is to be noted that, the calibrator simultaneously calibrates the in-phase and quadrature imbalances of the video signal and the audio signal according to the group of calibrating coefficients ($W_{V1s}$, $W_{V1i}$).

FIG. 6.4 is a flow chart of a secondary flow of a method for calibrating an AV signal in accordance with an embodiment of the present invention. More specifically, FIG. 6.4 shows the step of generating the group of calibrating coefficients ($W_{V1s}$, $W_{V1i}$) according to the filtered AV signal as described in Step 643 of FIG. 6.3. In Step 6431, the group of calibrating coefficients ($W_{V1s}$, $W_{V1i}$) are respectively defined as an initial value of zero.

In Step 6432, the status of the control signal is determined. When it is determined that the control signal is in the first status, the flow proceeds to Step 6433 in which an updating coefficient μ is defined as a first value.

In Step 6434, the group of calibrating coefficients ($W_{V1s}$, $W_{V1i}$) are updated according to the updating coefficient μ defined as the first value via an MMSE method. More specifically, the calibrating coefficients $W_{V1s}$ are updated according to the amplitude and phase of the in-phase components of the filtered video signal and the updating coefficient μ defined as the first value, and the calibrating coefficients $W_{V1i}$ are updated according to the amplitude and phase of the quadrature components of the filtered video signal and the updating coefficient μ defined as the first value.

In Step 6432, when it is determined that the control signal is in the second status (i.e., not in the first status), the flow proceeds to Step 6435 in which the updating coefficient μ is defined as zero, which means that the group of calibrating coefficients ($W_{V1s}$, $W_{V1i}$) are converged to a target value and need not be updated. Therefore, in Step 6436, the group of calibrating coefficients ($W_{V1s}$, $W_{V1i}$) are generated.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for calibrating a baseband audio-visual (AV) signal, comprising:
   a controller, for generating a control signal;
   a controllable filter, for selectively filtering the baseband AV signal in response to the control signal to selectively output the baseband AV signal and a filtered baseband AV signal; and
   a calibrator, for generating a group of calibrating coefficients recursively according to the in-phase and quadrature imbalances of the amplitude and phase of the video portion of the filtered baseband AV signal, and thereafter, changing the state of the control signal and calibrating the baseband AV signal according to the group of calibrating coefficients.

2. The apparatus as claimed in claim 1, wherein the baseband AV signal comprises a video signal having a first frequency and an audio signal having a second frequency which is different from the first frequency.

3. The apparatus as claimed in claim 2, wherein the controllable filter comprises a filter and a bypass circuit.

4. The apparatus as claimed in claim 3, wherein the filter is a first band-pass filter associated with the first frequency.

5. The apparatus as claimed in claim 3, wherein the bypass circuit comprises a multiplexer, which has a first input end for receiving the baseband AV signal and a second input end for receiving the filtered baseband AV signal, and the multiplexer coupled to the controller selectively conducts the first input end and the second input end in response to the control signal.

6. The apparatus as claimed in claim 2, wherein the controller generates the control signal according to an operation mode of the calibrator.

7. The apparatus as claimed in claim 2, wherein the controllable filter filters out one of the audio signal and the video signal in response to a first status of the control signal to generate the filtered baseband AV signal.

8. The apparatus as claimed in claim 6, wherein the controllable filter inputs the video signal to the calibrator in response to a second status of the control signal.

9. The apparatus as claimed in claim 1, wherein the calibrator comprises a minimum mean-square error (MMSE) update unit for generating the group of calibrating coefficients and updating the group of calibrating coefficients via an updating coefficient ($\mu$).

10. The apparatus as claimed in claim 9, wherein the MMSE update unit configures the updating coefficient as a first value in response to a first status of the control signal, and configures the updating coefficient as zero in response to a second status of the control signal.

11. A method, for calibrating a baseband AV signal, comprising:
providing a control signal;
selectively filtering the baseband AV signal in response to the control signal, and outputting either the baseband AV signal or a filtered baseband AV signal; and
generating a group of calibrating coefficients recursively according to the in-phase and quadrature imbalances of the amplitude and phase of the video portion of the filtered baseband AV signal, and thereafter, changing the state of the control signal and calibrating the baseband AV signal according to the group of calibrating coefficients.

12. The method as claimed in claim 11, wherein the step of calibrating the baseband AV signal comprises:
calibrating a video signal having a first frequency and an audio signal having a second frequency, with the first frequency being different from the second frequency.

13. The method as claimed in claim 12, wherein the step of selectively filtering the baseband AV signal comprises:
filtering out one of the audio signal and the video signal in response to a first status of the control signal, and outputting the filtered baseband AV signal; and outputting the baseband AV signal in response to a second status of the control signal.

14. The method as claimed in claim 11, wherein the step of generating the group of calibrating coefficients according to the filtered AV signal and calibrating the baseband AV signal according to the group of calibrating coefficients comprises:
receiving the filtered baseband AV signal in response to a first status of the control signal, and generating the group of calibrating coefficients according to the filtered baseband AV signal; and
receiving the baseband AV signal in response to a second status of the control signal, and calibrating the baseband AV signal according to the group of calibrating coefficients.

15. The method as claimed in claim 11, wherein the step of generating the group of calibrating coefficients according to the filtered baseband AV signal comprises:
generating the group of calibrating coefficients via an MMSE method; and
updating the group of calibrating coefficients according to an updating coefficient ($\mu$).

16. The method as claimed in claim 15, comprising:
configuring the updating coefficient as a first value in response to the control signal; and
configuring the updating coefficient as zero in response to a second status of the control signal.

17. The method as claimed in claim 11, being adapted to AV signals in an analog television (TV) system.

* * * * *